UNITED STATES PATENT OFFICE.

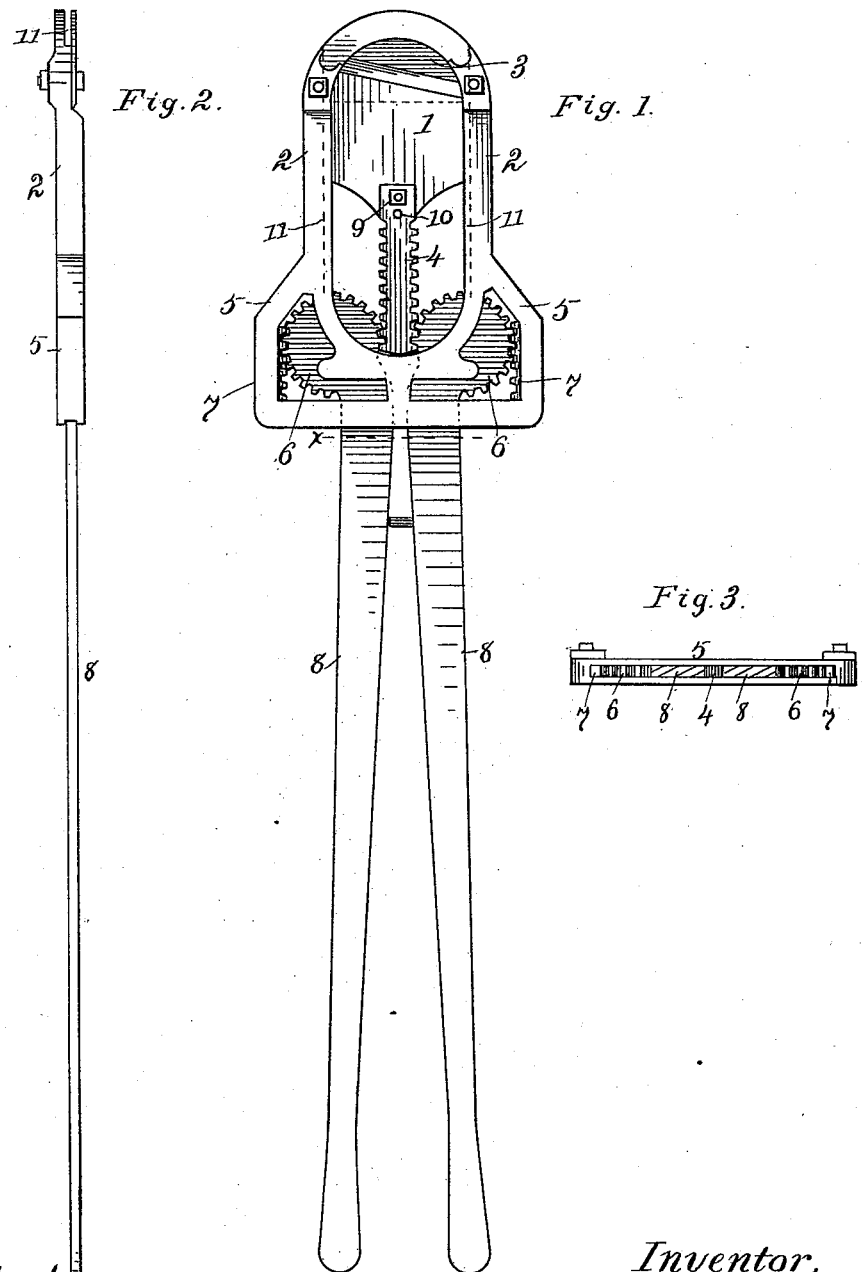

HARRY W. LEAVITT, OF HAMMOND, ILLINOIS.

DEHORNER.

SPECIFICATION forming part of Letters Patent No. 534,112, dated February 12, 1895.

Application filed December 1, 1894. Serial No. 530,535. (No model.)

*To all whom it may concern:*

Be it known that I, HARRY W. LEAVITT, of Hammond, in the county of Piatt and State of Illinois, have invented certain new and useful Improvements in Dehorners, of which the following is a specification.

This invention relates to dehorners in which a cutter has a rack bar toothed on opposite sides and the handles have pinion-like ends which engage the rack and provide means for moving the cutter. It is exemplified in the structure hereinafter described, and it is defined in the appended claims.

In the drawings forming part of this specification Figure 1 is a diagram of a face of a dehorner constructed in accordance with my invention. Fig. 2 is a side elevation of the dehorner. Fig. 3 is an end view of the cutter frame, showing the handles in cross section on line X in Fig. 1.

The movable cutter is shown at 1, the guides therefor at 2, and the relatively fixed cutter at 3. The rack bar 4 is secured to cutter 1 by bolt 9, and it extends backward therefrom in line with the motion thereof. Racks 7 are formed in frame 5 on opposite sides of rack bar 4 and parallel therewith. The pinions 6 are formed on the ends of handles 8. They are placed one on each side of the central rack and they mesh with such rack and with the side racks. The frame 5 is recessed to receive the pinions of the handle, as indicated in Fig. 3, and the pinions move freely up and down the side racks when the handles are moved. The parts 2 are grooved to provide slides for cutter 1, as indicated in dotted lines at 11, and the grooves extend entirely through the front end of the cutter frame in such manner that the cutter may be placed in and removed from the frame through such grooves. This peculiarity is shown by the direction of the dotted lines in Fig. 1 and by the opening in the upper end of Fig. 2. A pin, 10, extends through the central rack, near bolt 9, and projects sufficiently far to engage the frame when the handles are opened to their fullest extent.

The parts may be put together by placing the handles in the racks 7 while in wide open positions, putting the inner end of the central rack between the pinions and closing the handles, sliding the cutter 1 into position through grooves 11, securing the cutter to the central rack and inserting the stop pin 10. In this operation the pinions ride up the side racks to the position shown in Fig. 1 and carry the central rack with them; and after pin 10 is inserted it will strike the frame and prevent the opening of the handles sufficiently far to disengage the pinions from the side racks. This enables the cutter 1 to be detached from the rack and withdrawn from the frame, for the purpose of sharpening, or for any other purpose, and the pinions to be held in the cutter frame in the meantime.

The pinions travel down the side racks when the handles are opened and at the same time draw the central rack bar down between them. This provides an unusually large opening between the cutters, capable of admitting the largest horns without difficulty.

As the handles are closed the pinions tend to draw the cutter 3 in one direction, by pulling on the side racks of the frame, and to force cutter 1 in the opposite direction by pushing on rack 4. This necessitates equal pressure on both cutters and effects a superior result in the dehorning operation.

The device is easily made and easily put together, the bolts for the fixed cutter and the bolt and pin for the sliding cutter being the only parts requiring special manipulation in building up the device.

Having thus described my invention, I claim as new and desire to secure by Letters Patent—

1. The combination, in a dehorner, of a frame, a cutter slidable in the frame and having a rack bar toothed on opposite sides, side racks in the frame, parallel with the rack of the cutter, pinions meshing with the side racks and with the rack of the cutter, and handles extending from the pinions, substantially as set forth.

2. The combination, in a dehorner, of a frame, a cutter slidable in the frame and having a rack bar toothed on opposite sides, side racks in the frame, parallel with the rack of the cutter, handles having pinions meshing with the side racks and with the rack of the cutter, and a stop on the rack of the cutter adapted to limit the motion of the rack in the frame, substantially as and for the purpose set forth.

3. The combination of frame 2, 5, having grooves 11 and the recess for the pinions, the cutter 3 fastened to the frame, the cutter 1 slidable in grooves 11, the rack bar 4 fastened to the slidable cutter, the side racks 7, and the handles 8 having the pinions 6 each meshing with the central rack and with a side rack, substantially as and for the purpose set forth.

In testimony whereof I sign my name in the presence of two subscribing witnesses.

HARRY W. LEAVITT.

Attest:
W. T. MASON,
T. J. KIZER.